Patented Mar. 21, 1944

2,344,625

UNITED STATES PATENT OFFICE 2,344,625

NEW HYDROXY-ANILIDO-NAPHTHALENE-SULPHONAMIDES

Herbert A. Lubs and Newell M. Bigelow, Wilmington, Del., assignors to E. I. du Pont de Nemours & Company, Wilmington, Del., a corporation of Delaware No Drawing. Original application May 21, 1941, Serial No. 394,490. Divided and this application October 29, 1941, Serial No. 416,996

4 Claims. (Cl. 260—556)

This invention relates to new indophenols and methods of manufacturing the same, and especially to indophenols having an amino-naphthalene-sulphonamide group and which, upon thionation, are suitable for making new sulphur dyes in shades of green to blue.

Heretofore, commercially important green sulphur dyes have been prepared by thionating leucoindophenols having amino-naphthalene sulphonic acid groups, such as 1-amino-4-(p'-hydroxy - anilino) - naphthalene - 6 - (or 7)-sulphonic acid which is derived from Cleve's acid, and from a similar indophenol derived from N-phenyl peri acid, (1-phenylnaphthylamine-8-sulphonic acid). However, the dyes made with such sulphur dyes do not have as good fastness to washing or laundering as that required by the highest standards of dyeing and the dyes tend to migrate from dyed areas to adjacent undyed areas during washing. Sulphur dyes of similar shade having improved washing fastness and non-migrating properties were desired.

It is among the objects of the invention to provide new indophenols or intermediates for sulphur dyes whereby, upon sulphonation, new sulphur dyes may be produced in shades of green, blue-green and blue which have better fastness to laundering than the sulphur dyes of the type heretofore provided. Other objects of the invention will be apparent from the following description.

The objects of the invention are attained in general by reacting a para-amino-phenol represented by the formula

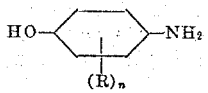

wherein R is from a group consisting of hydrogen, halogen and methyl and $n$ is an integer not greater than 2, with a 1-amino-naphthalene-6(-7 or -8)-sulphonamide having the formula

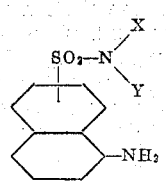

wherein X taken singly is one of a group consisting of hydrogen, alkyl having 1 to 5 carbons, the corresponding monohydroxy-alkyl groups, and phenyl; taken singly Y is one of a group consisting of hydrogen and alkyl having 1 to 4 carbons and taken collectively X and Y together with N represent the residue of a cyclic amine wherein the ring contains four —CH$_2$— groups.

The invention will be more fully set forth in the following more detailed description which includes examples that are given as illustrative embodiments of the invention and not as limitations thereof. Parts are expressed in parts by weight unless otherwise noted.

Example 1

A solution of 1.00 part of 1-amino-naphthalene-6-sulphonamide and 0.18 part of sodium hydroxide in 10.0 parts of water was chilled to 0° C. At this temperature, 0.49 part of p-aminophenol was added. The mixture was agitated until solution was complete. Then 5.00 parts of crushed ice were added. Following this, a solution of 0.670 part of sodium hypochlorite in 6.0 parts of water was added over the course of about three minutes with vigorous agitation. The temperature was not allowed to rise above 0° C. during the addition. When the addition was complete, the solution was agitated at or below 0° C. for a few minutes, then a solution of 2.40 parts of sodium sulphide crystals in a minimum of water was added. The resulting solution was allowed to warm slowly to room temperature, with agitation. During this time, reduction of the indophenol to the leucoindophenol took place. At the end of this time, the solution was again chilled to 0° C. and acidified at this temperature with 37% hydrochloric acid. The leucoindophenol, 1-amino-4-(p'-hydroxy-anilino)-naphthalene-6-sulphonamide, separated out. It was filtered, washed thoroughly with water and retained as a wet paste.

A mixture of 1.45 parts of sodium hydroxide, 2.72 parts of sulphur and 4.0 parts of water was refluxed until solution of the sulphur was complete and then 1.00 part 1-amino-4-(p'-hydroxy-anilino)-naphthalene-6-sulphonamide was added in the form of a wet paste. Enough additional water was added to equal a total weight of 11.00 parts. This mixture was refluxed for 24 hours.

At the end of this time, the solution was diluted with water to a total weight of 20.0 parts. The solution was heated with agitation to 75° C. A vigorous current of air was passed through the solution. Sodium hydroxide was added in quantities sufficient to keep the mixture alkaline to Clayton Yellow paper. When a spot of the reaction mixture on absorbent paper gave a dark central spot, surrounded by a clear blue ring, the aeration was stopped. Five parts of sodium chloride were added; the mixture was agitated for 10 minutes, then filtered. The filter cake was washed with 15% sodium chloride solution until the washings were neutral or weakly alkaline to phenolphthalein paper. The product was dried at 75° C.

The product was soluble in warm dilute sodium sulphide solution. Cotton goods, immersed in this dyebath, were dyed a bright, bluish green upon being developed in the air. The fastness of the dyeings to laundering was better than those made with the sulphur dye produced by thionation of the leucoindophenol derived from p-amino-phenol and the corresponding free amino-naphthalene sulphonic acid.

Example 2

A solution of 1.00 part of 1-amino-naphthalene-6-sulphon-methylamide in 10.0 parts of water and 0.20 part of sodium hydroxide was chilled to 0° C. At this temperature, 0.46 part of p-amino-phenol was added. When this had dissolved, 5.0 parts of crushed ice was added. Then a solution of 0.63 part of sodium hypochlorite in 5.0 parts of water was slowly added to the vigorously agitated solution over the course of three minutes. The mixture was stirred for three minutes more; then a solution of 2.00 parts of crystalline sodium sulphide in 2.0 parts of water was added. The solution was allowed to warm slowly to room temperature. When reduction was complete, the solution was chilled to 5° C. and neutralized at this temperature with 25% sulphuric acid. The crystalline leucoindophenol was filtered, washed, and retained as a moist paste.

A mixture of 4.00 parts of ethyl alcohol, 2.82 parts of crystalline sodium sulphide and 1.50 parts of sulphur was heated and refluxed with agitation until the sulphur had completely dissolved. The mixture was cooled to 75° C.; at this temperature one part of 1-amino-4-(p'-hydroxy-anilino)-naphthalene-6-sulphon-methylamide in the form of a moist paste was added. Then a solution of 0.31 part of nickel sulphate (hexahydrate) in a minimum of water was added. The mixture was refluxed for 60 hours. At the end of this time, it was diluted to a total weight of 40 parts. Sodium bisulphite (1.53 parts) and sodium sulphite (1.85 parts) were added, and the suspension was digested for four hours at 90° C. At the end of this time, the mixture was cooled to room temperature and filtered; the filter cake was washed thoroughly with water and dried at 70° C. The product was a dark grey powder which was soluble in warm dilute sodium sulphide solution.

A piece of cotton goods, immersed in a dyebath made by dissolving the product in a dilute water solution of sodium sulphide and then developed in a warm dilute solution of hydrogen peroxide or sodium perborate, was dyed a deep blue. The fastness properties of the dyeings were excellent.

Example 3

A suspension of 1.00 part of 1-amino-naphthalene-6-sulphon-dimethylamide and 0.58 part of monochlor-p-amino-phenol in 10 parts of water was chilled to 0° C. At this temperature, 0.02 part of sodium hydroxide was added. This was followed by 5.0 parts of crushed ice. Then a solution of 0.59 part of sodium hypochlorite in 3 parts of water was added to the vigorously agitated solution over the course of three minute. The solution was agitated at or below 0° C. for five minutes more, then a solution of 1.44 parts of crystalline sodium sulphide in 1.5 parts of water was added. The solution was allowed to warm to room temperature, and held here until the deep red solution had faded to a dark yellow, then it was acidified at this temperature with 37% hydrochloric acid. The leucoindophenol was filtered, washed thoroughly with water and held as a moist paste.

A solution of polysulphide was prepared by refluxing a mixture of 0.92 part of sodium hydroxide, 2.46 parts of sulphur and 4.0 parts of water. To this polysulphide was added 1.0 part of 1-amino-4-(p'-hydroxy-anilino)-naphthalene-6-sulphon-dimethylamide, the preparation of which has just been described. If necessary, water was added to give a total of 6.0 parts. The mixture was refluxed for 24 hours. At the end of this time, it was diluted to 25.0 parts with water. The mixture was warmed to 95° C. and a vigorous current of air blown through it. Sodium carbonate was added from time to time in small quantities sufficient to keep the mixture alkaline to phenolphthalein paper. When the aeration was complete, as indicated by the spot test described in Example 1, the suspension was filtered and washed thoroughly with dilute sodium chloride solution. The product was a black powder which was soluble in dilute sodium sulphide solution.

A piece of cotton goods, immersed in a dilute aqueous sodium sulphide solution of the dye and then developed in the air, was dyed a bluish green. The dyeing was slightly bluer than those described in Example 1. The fastness properties of the dyeings were good.

Example 4

1-amino-4-(4'-hydroxy-anilino)-naphthalene-7-sulphonamide was prepared by the oxidation of 1-amino-naphthalene-7-sulphonamide and p-amino-phenol with sodium hypochlorite exactly as described in the case of the 1:6-isomer in Example 1.

Sodium polysulphide was prepared by refluxing 1.09 parts of sodium hydroxide, 2.04 parts of sulphur, 4.0 parts of water and 2.0 parts of the mono-ethyl ether of ethylene glycol. The polysulphide was cooled to 70° C.; to it was added 1.0 part of the leucoindophenol described above and a solution of 0.38 part of copper sulphate pentahydrate in 1.0 part of water. The mixture was refluxed for 30 hours. At the end of this time, it was diluted to a total weight of 25.0 parts with water. One-half part of sodium hydroxide and 3.0 parts of sodium carbonate were added and the solution was aerated at 90° C. If necessary, more sodium carbonate was added in quantities sufficient to keep the mixture alkaline to phenolphthalein paper. When the aeration was complete, the mixture was filtered and washed with water until neutral or weakly alkaline to phenolphthalein paper. After drying, the product was a black amorphous powder, insoluble in water but soluble in warm dilute sodium sulphide solution. Pieces of cotton goods immersed in a bath made by dissolving the product in a dilute sodium sulphide water solution were dyed, upon development in air, a bright, strong green. The fastness properties of the dyeings were excellent.

Example 5

A solution of 1.0 part of 1-amino-napthalene-7-beta-hydroxy-ethyl-sulphonamide and 0.15 part of sodium hydroxide in 8.0 parts of water was chilled to 5° C. Four parts of ice were added; then a solution of 0.56 part of sodium hypochloride in 4.0 parts of water was added to the vigorously agitated solution over the course of five minutes. The mixture was agitated at or below 0° C. for three minutes more, then a solution of 1.36 parts of crystalline sodium sulphide in an equal weight of water was added. The solution was agitated for an hour and was allowed to rise slowly to room temperature. Then it was again chilled to 0° C. and acidified at this temperature with 37% hydrochloric acid. The leucoindophenol was filtered, washed thoroughly with water and held in the form of a moist paste.

Sodium polysulphide was prepared in the usual manner from 0.97 part of sodium hydroxide, 2.10 parts of sulphur, 2.0 parts of water and 5.0 parts of ethyl alcohol. To this polysulphide was added 1.0 part of the leucoindophenol, the preparation of which has just been described, and a solution of 0.27 part of copper sulphate pentahydrate in 2.0 parts of water. The mixture was refluxed for 50 hours. The product was isolated by aeration in a suspension kept alkaline to Clayton Yellow paper, as described in previous examples.

Dissolved in warm sodium sulphide solution, this product dyed cotton, upon development in air, a strong, bright green. The fastness properties of the dyeings, particularly to laundering, were excellent.

Example 6

1-amino-4-(4'-hydroxy-anilino)-naphthalene-7-sulphonanilide was prepared by the oxidation of 1.0 part of 1-amino-naphthalene-7-sulphonanilide, and 0.37 part of p-amino-phenol by means of 0.50 part of sodium hypochlorite in aqueous solution at 0° C. in the manner otherwise like the process of Example 5. The indophenol was reduced, as usual, with sodium sulphide. Sodium polysulphide was prepared in the usual manner from 2.38 parts of crystalline sodium sulphide, 1.59 parts of sulphur, and 4.0 parts of water. To the polysulphide was added 1.0 part of the leucoindophenol, the preparation of which has just been described, in the form of an aqueous paste containing approximately 2.0 parts of water. The mixture was thionated for 20 hours, then it was diluted to a total weight of 30 parts. Three parts of sodium hydroxide were added and the mixture was agitated at 80° C. for two hours. Then the solution was chilled to 10° C. and acidified at this temperature with dilute sulphuric acid. The precipitated dye was filtered and washed with water until the washings were no longer acid. After drying, the product was a tan powder which was insoluble in water but soluble in warm sodium sulphide solution. Cotton, immersed in this dyebath and then developed in a dilute solution of sodium perborate or hydrogen peroxide, was dyed in blue-green shades, yellower than the dyeings described in Example 4.

Example 7

A suspension of 1.0 part of 1-amino-naphthalene-7-sulphonanilide and 0.44 part of dichloro-p-amino-phenol in 8.0 parts of water was chilled to 0° C. Two-tenths of one part of sodium hydroxide was added and the mixture was agitated until solution was complete. Four parts of ice were added, then a solution of 0.37 part of sodium hypochlorite in 5.0 parts of water was added to the vigorously agitated solution over the course of three minutes. Agitation was continued for a few minutes more, then 1.04 parts of crystalline sodium sulphide were added, and the solution warmed to room temperature. When the indophenol was completely reduced, 3.0 parts of sodium chloride were added and the solution was agitated until precipitation of the leucoindophenol was completed. The precipitate was filtered off and washed with 20% salt solution until the washings were light in color. Sodium polysulphide was prepared from 1.04 parts of crystalline sodium sulphide, 0.93 part of sulphur, 2.5 parts of water and 4.8 parts of the mono-ethyl ether of ethylene glycol. To it was added 1.0 part of the above leucoindophenol. The mixture was thionated for 16 hours. Then the mixture was diluted with water and aerated at 95° C. in the presence of an excess of sodium carbonate. The precipitated dye was washed, filtered and dried.

Pieces of cotton goods dyed with this product from a sulphide bath and developed in air were colored a strong blue-green shade.

In the preparation of the intermediates, para-amino-phenol or any of its derivatives can be used which are represented by the formula

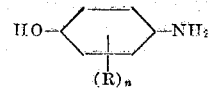

wherein R represents substituents hereinbefore described, as for example the para-amino-cresols, the para-amino-xylenols and the 1-amino-mono- and di-chloro-para-hydroxy-benzenes. As illustrations of such compounds are mentioned p-amino-2(and -3)-cresol, 2,5-dimethyl-4-amino-phenol and 1,4-dimethyl-2-hydroxy-5-amino-benzene.

Combinations of these para-amino-phenols with any of the naphthylamines represented by the formula

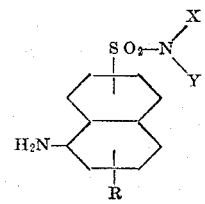

wherein R, X and Y represent the groups hereinbefore described, may be used to make the intermediates which produce upon thionation the new dyes having the described properties. As representative of such compounds are mentioned 1-amino-2-methyl-naphthalene-6-sulphon-ethyl-beta-hydroxy-ethyl-amide, 1-amino-naphthalene-7-sulphon-dimethyl-amide, 1-amino-naphthalene-8-sulphon-morpholide and 1-amino-naphthalene-8-sulphon-anilide.

As representative of other leucoindophenols which, upon thionation, produce sulphur dyes having the improved properties of the dyes hereinbefore described are mentioned 1-amino-2-methyl-4-(3':5'-dichlor-4'-hydroxy-anilino) naphthalene-6-sulphon-beta-hydroxy-propylamide, 1-amino-4-(2'-methyl-4'-hydroxy-anilino)-naphthalene-7-sulphon-dimethyl-amide, 1-amino-4-(3'-chloro-4'-hydroxy-anilino)-naphthalene-7-sulphon-p-toluidide, 1-amino-3-bromo-4-(4'-hydroxy-anilino)-naphthalene-6-sulphon-piperidine and 1-amino-1-(3'-methyl-4'-hydroxy-anilino)-5-nitro-naphthalene-8-sulphon-anilide.

The new dyes contain a much smaller content of sulphur and a much larger content of nitrogen than dyes made from similar intermediates except that the naphthalene radical is substituted by a free sulphonic acid group or alkali metal salt thereof. An analysis of a typical dye of the present invention shows 18.02% sulphur and 5.42% nitrogen, whereas the analysis of a similar dye derived from the free sulphonic acid naphthalene compound shows 33.16% sulphur and 3.34% nitrogen.

Attempts have been made without success to convert the color derived from the free sulphonic acid naphthalene compound to the color produced by the process of the present invention by converting the sulphonic acid group of the color into a sulphonamide group. While it was possible to effect the conversion, the properties of the dyeings made with the resultant color were identical with those made with the unconverted colors. The fastness to laundering of dyeings made with the dyes of the invention is much better than the dyeings produced by thionating corresponding compounds which are similarly substituted in the naphthalene nucleus by a sulphonic acid group. The new dyes in general have somewhat better light fastness but the difference is not as great. In certain cases the tinctorial strength of the new sulphonamide dyes is distinctly greater than the dyes derived from the naphthylamine sulphonic acid intermediates. The brightness of the dyeings made with the dyes of the invention and the solubility of the dyes in dilute aqueous sodium sulphide solution compare favorably with the brightness and solubility properties of the dyes made from similar derivatives of naphthylamine sulphonic acid.

This application is a division of our application Serial No. 394,490, filed May 21, 1941.

From the foregoing disclosure it will be recognized that the invention is susceptible of modification without departing from the spirit and scope thereof and it is to be understood that the invention is not restricted to the specific illustrations thereof herein set forth.

We claim:

1. 1-amino - 4-(4'-hydroxy-anilino)-naphthalene-6-sulphonamide.
2. 1-amino - 4-(4'-hydroxy-anilino)-naphthalene-6-sulphonanilide.
3. 1-amino - 4-(4'-hydroxy-anilino)-naphthalene-7-sulphonamide.
4. A compound represented by the formula

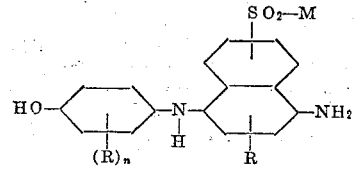

in which R is from a group consisting of hydrogen, halogen and methyl; $n$ is an integer not greater than 2; and M is one of a group consisting of primary amino, secondary-alkyl and -hydroxyalkyl amino, secondary phenyl-amino and toluyl-amino, tertiary di-alkyl amino and tertiary alkyl-hydroxyalkyl amino groups wherein the alkyl groups are lower alkyl.

HERBERT A. LUBS.
NEWELL M. BIGELOW.

CERTIFICATE OF CORRECTION.

Patent No. 2,344,625. March 21, 1944.

HERBERT A LUBS, ET AL.

It is hereby certified that error appears in the printed specification of the above numbered patent requiring correction as follows: Page 1, second column, line 38, for "1.45 parts" read --1.46 parts--; page 3, second column, lines 69 and 70, for "amino-1-" read -- amino-4- --; and that the said Letters Patent should be read with this correction therein that the same may conform to the record of the case in the Patent Office.

Signed and sealed this 23rd day of May, A. D. 1944.

Leslie Frazer

(Seal) Acting Commissioner of Patents.